(12) United States Patent
Liu

(10) Patent No.: US 6,547,067 B1
(45) Date of Patent: Apr. 15, 2003

(54) CD HOLDER STRUCTURE FOR AN INDIVIDUAL CD CASE

(76) Inventor: Liang-Jung Liu, No. 24, Lane 136, Chunghsing N. Rd., Sanchung City, Taipei County (TW)

( * ) Notice: Subject to any disclaimer, the term of this patent is extended or adjusted under 35 U.S.C. 154(b) by 3 days.

(21) Appl. No.: 09/977,535

(22) Filed: Oct. 16, 2001

(51) Int. Cl.[7] ............................................. B65D 85/57
(52) U.S. Cl. ................................. 206/308.1; 206/310
(58) Field of Search .......................... 206/307, 308.1, 206/309, 310, 311, 312, 313, 493

(56) References Cited

U.S. PATENT DOCUMENTS 6,276,524 B1 * 8/2001 Cerda-Vilaplana et al. ...... 206/308.1
6,398,022 B1 * 6/2002 Mou et al. ................ 206/308.1
2001/0000599 A1 * 5/2001 Belden, Jr. ................... 206/310
2002/0040857 A1 * 4/2002 Ho et al. ..................... 206/310

* cited by examiner

Primary Examiner—Jacob K. Ackun
(74) Attorney, Agent, or Firm—Rosenberg, Klein & Lee

(57) ABSTRACT

A CD holder structure having a flexible, circular, convex pad integral with a plate mounted inside a CD case, convex pad having a keeper with a top button, a plurality of main cuts respectively extended from respective splits in the keeper, and a plurality of working areas respectively defined between each two adjacent main cuts, the working areas each having a substantially U-shaped cut and a springy strip surrounded by the U-shaped cut, the spring strip having an upright top bearing flange adapted to support the storage CD, and a downward bottom supporting flange stopped at the plate and adapted to give an upward reactive force to the storage CD through the upright top flange upon pressing of the button by the user.

4 Claims, 4 Drawing Sheets

CD HOLDER STRUCTURE FOR AN INDIVIDUAL CD CASE

BACKGROUND OF THE INVENTION

The present invention relates to an individual CD case and, more specifically, to a CD holder structure for an individual CD case, which positively holds the storage CD (compact disk) in position, enabling the storage CD to be quickly taken away.

Conventional individual CD cases commonly have a CD holder plate provided on the inside. The CD holder plate has a split keeper adapted to hold a CD (compact disk). When taking the storage CD from the CD holder plate, the user must press the split keeper downwards with one hand, and then pull the storage CD upwards from the keeper with the other hand. This procedure is complicated.

SUMMARY OF THE INVENTION

The present invention has been accomplished to provide a CD holder structure for an individual CD case, which eliminates the aforesaid drawback. It is one object of the present invention to provide a CD holder structure for an individual CD case, which enables the user to unlock the storage CD and take it away from the keeper with one single hand. It is another object of the present invention to provide a CD holder structure for an individual CD case, which is inexpensive to manufacture. According to one aspect of the present invention, the CD holder structure comprises a plate for mounting inside a CD case, and a flexible, circular, convex pad fixedly fastened to the plate. The convex pad comprises a keeper with a top button, a plurality of main cuts respectively extended from respective splits in the keeper, and a plurality of working areas respectively defined between each two adjacent main cuts. The working areas each have a substantially U-shaped cut and a springy strip surrounded by the U-shaped cut. The spring strip comprises an upright top bearing flange adapted to support the storage CD, and a downward bottom supporting flange stopped at the plate and adapted to give an upward reactive force to the storage CD through the upright top flange upon pressing of the button by the user. According to another aspect of the present invention, the flexible, circular, convex pad is injection-molded with the plate from flexible plastics.

DETAILED DESCRIPTION OF THE PREFERRED EMBODIMENT

Figure 1:
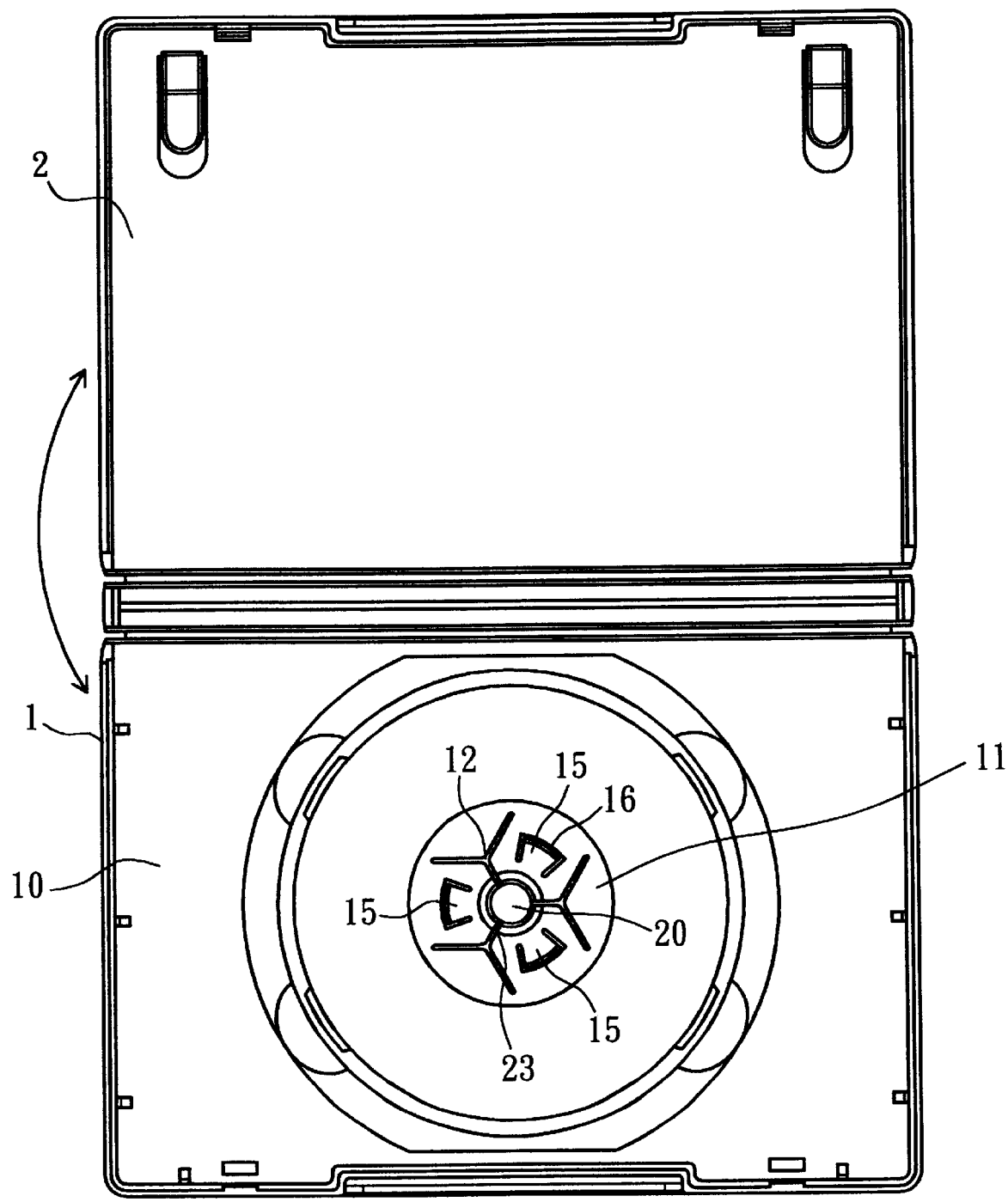
FIG. 1 is a top view showing a CD case opened according to the present invention.

Referring to FIGS. from 1 through 3, a CD (compact disk) case 1 has a hinged cover 2. A plate 10 is mounted inside the case 1, and adapted to hold a CD. The plate 10 comprises a hollow, compressible, cylindrical keeper 21 at the center. The keeper 21 comprises a button 20 integral with the top sidewall thereof, an annular groove 22 disposed in the top sidewall around the button 20, and a plurality of splits 23 radially outwardly extended from the periphery of the button 20.

The keeper 21 is formed integral with the center of a flexible, circular, convex pad 11, which is peripherally fastened to the plate 10. The flexible, circular, convex pad 11 comprises a plurality of, for example, three Y-cuts 12 respectively extended from the splits 23 of the keeper 21. When pressed on the button 20, the keeper 21 is compressed, and the areas between each two adjacent Y-cuts 12 of the convex pad 11 are lowered with the keeper 21. In each area between two adjacent Y-cuts 12, there is provided a substantially U-shaped cut formed of two side cuts 13 and a front cut 14 connected between the side cuts 13, and a springy strip 15 surrounded by the U-shaped cut of the side cuts 13 and the front cut 14. The spring strip 15 has an upright bearing flange 16 upwardly protruded from the top sidewall of the convex pad 11 and extended along the front cut 14 between the side cuts 13, and a downward supporting flange 17 downwardly protruded from the bottom sidewall of the convex pad 11 and perpendicularly extended from the front cut 14 and equally spaced between the side cuts 13.

Figure 3A:
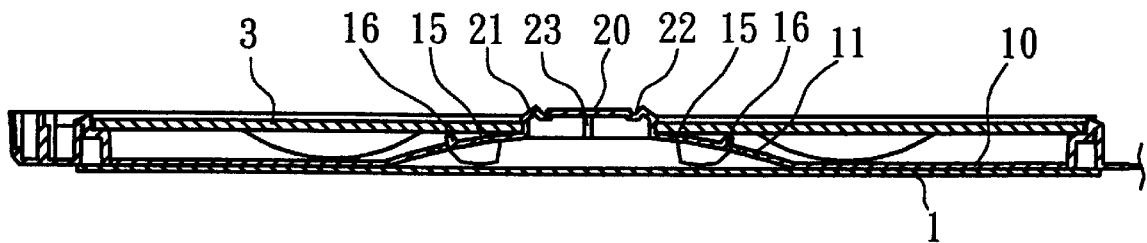
FIG. 3A is a sectional view of the present invention showing a storage CD installed in the CD holder structure.
Figure 3B:
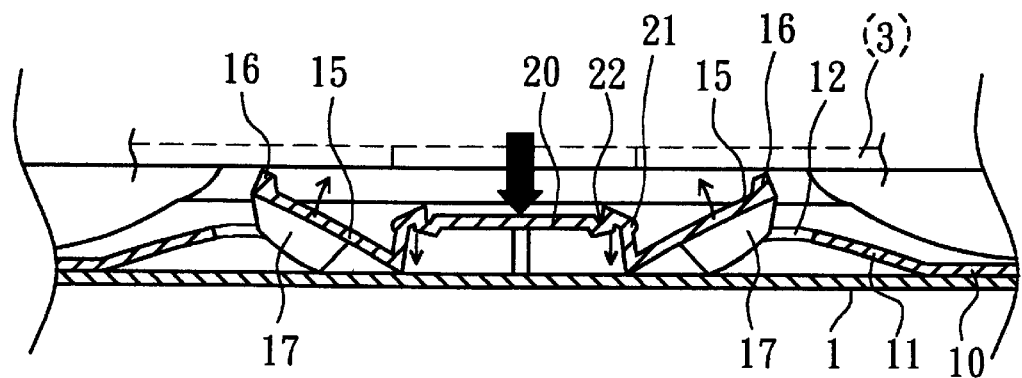
FIG. 3B is a sectional view of the present invention, showing the button pressed, the spring strips tilted, and the storage CD lifted.
Figure 4:
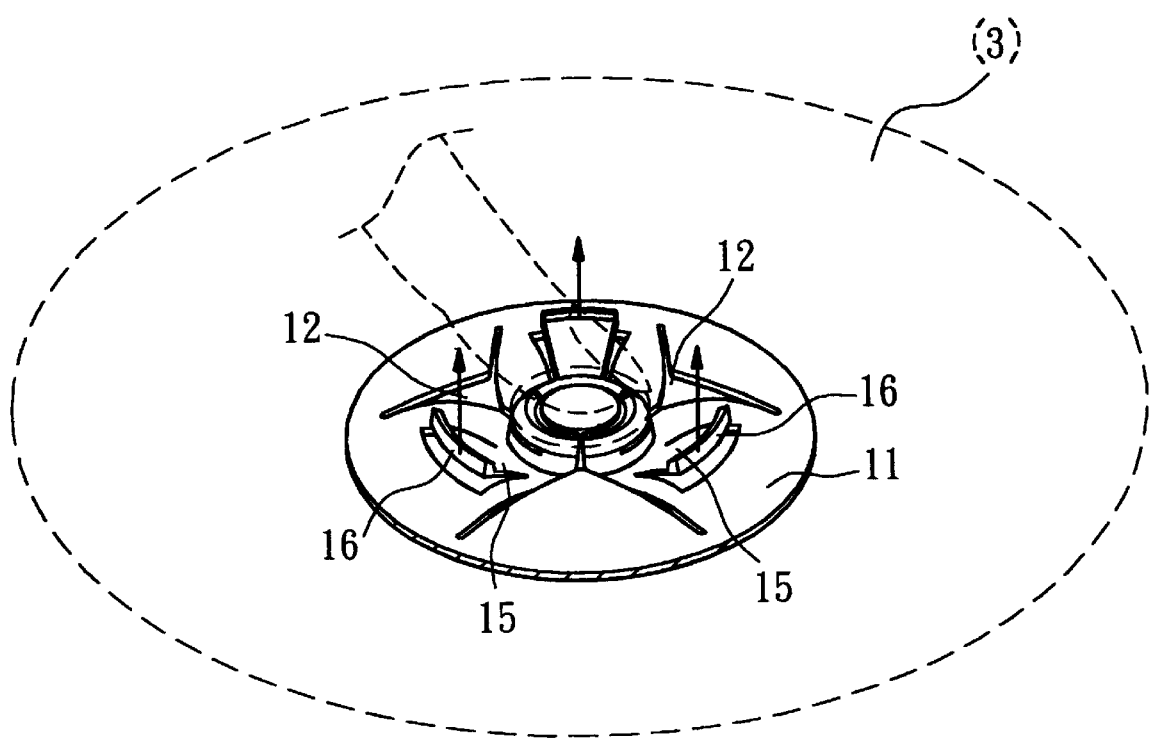
FIG. 4 is a perspective view of FIG. 3B.

The function of the present invention is outlined hereinafter with reference to FIGS. 3A, 3B, and 4. When loading a CD 3, the center hole of the CD 3 is coupled to the keeper 21, for enabling the bottom sidewall (the reading side) of the CD 3 to be supported on the upright bearing flange 16 of the convex pad 11 (see FIG. 3A). When removing the CD 3 from the keeper 21 (see FIGS. 3B and 4), press on the button 20 to compress the keeper 21 and simultaneously to lower the spring strips 15 between each two adjacent Y-cuts 12 of the convex pad 11. When lowered the spring strips 15, the downward supporting flanges 17 are stopped against the plate 10, thereby causing the spring strips 15 to tilt in one direction and to force the storage CD 3 upwards from the keeper 21, and therefore the user can easily take the storage CD 3 away from the keeper 21.

As indicated above, when pressed on the button 20, the keeper 21 is compressed, and the spring strips 15 are tilted to move the storage CD 3 upwards from the keeper 21 due a lever effect. The presence of the Y-cuts 12 enables the spring strips 15 to be quickly tilted to lift the storage CD 3 when the user pressed the button 20.

Further, when the CD 3 is loaded, it is supported on the upright flanges 16 of the spring strips 15, i.e., the upright flanges 16 prohibit direct contact of the reading side of the CD 3 with the plate 10, preventing friction damage to the CD 3.

Figure 2A:
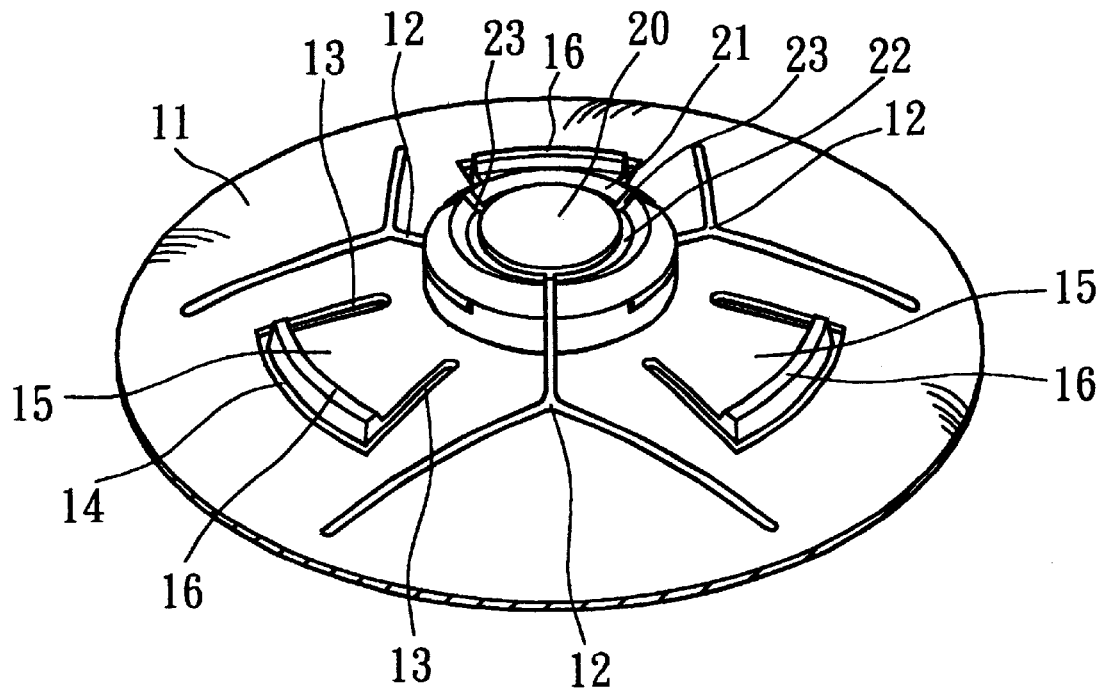
FIG. 2A is an oblique top elevation of a CD holder structure according to the present invention.
Figure 2B:
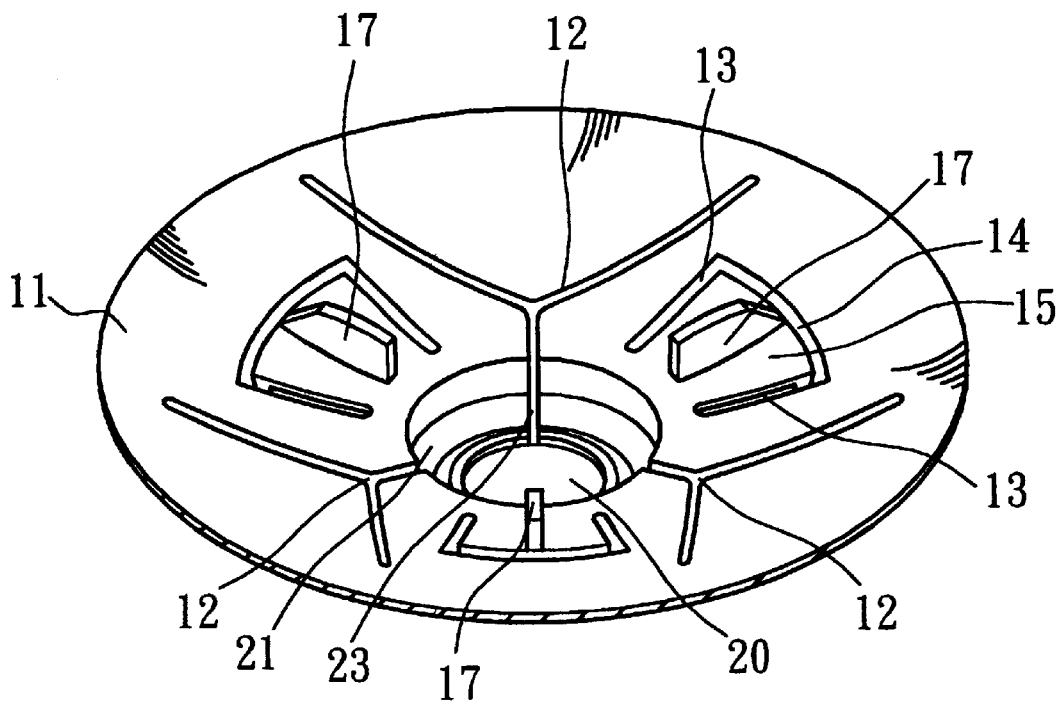
FIG. 2B is an oblique bottom elevation of the CD holder structure shown in FIG. 2A.

The invention may be variously embodied. For example, linear or different shapes of cuts may be formed in the convex pad 11 instead of the Y-cuts 12 shown in FIG. 2; or the convex pad 11 can be made having two or more than three Y-cuts 12. In FIG. 2, the convex pad 11 is formed integral with the top sidewall of the plate 10. Alternatively, the convex pad 11 can be separately made, and then bonded to the plate 10.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A CD (compact disk) holder structure comprising a plate mounted inside an individual CD case and adapted to hold a CD, said plate comprising a hollow, compressible, cylindrical keeper at the center thereof, said keeper comprising a top sidewall, a button integral with the top sidewall, an annular groove disposed in the top sidewall around said button, and a plurality of splits radially outwardly extended from the periphery of said button, wherein the CD holder structure further comprises a flexible, circular, convex pad formed integral with the periphery of a bottom side of said keeper and peripherally fastened to said plate, said flexible, circular, convex pad comprising a plurality of main cuts respectively extended from the splits of said keeper, and a plurality of working areas respectively defined between each two adjacent main cuts, said working areas each comprising a substantially U-shaped cut formed of two side cuts and a front cut connected between the side cuts, and a springy strip surrounded by said U-shaped cut, said spring strip having an upright bearing flange upwardly protruded from a top sidewall of said convex pad and extended along said front cut between said side cuts, and a downward supporting flange downwardly protruded from a bottom sidewall of said convex pad and perpendicularly extended from said front cut and equally spaced between said side cuts.

2. The CD (compact disk) holder structure as claimed in claim 1 wherein the number of said main cuts is 3, and said main cuts are Y-shaped cuts.

3. The CD (compact disk) holder structure as claimed in claim 1 where said convex pad is peripherally formed integral with a stop sidewall of said plate.

4. The CD (compact disk) holder structure as claimed in claim 1 wherein said convex pad is made with said keeper in integrity and then bonded to said plate.

* * * * *